(12) United States Patent
Lemmens et al.

(10) Patent No.: US 6,814,347 B1
(45) Date of Patent: Nov. 9, 2004

(54) BOOSTER TO ADAPT AIR SPRING PRESSURE FOR FDD SHOCK ABSORBER

(75) Inventors: Luc Lemmens, Genk (BE); Jacobus Schel, Overasselt (NL); Henri Vanhove, St. Truiden (BE)

(73) Assignee: Tenneco Automotive Operating Company, Inc., Lake Forest, IL (US)

( * ) Notice: Subject to any disclaimer, the term of this patent is extended or adjusted under 35 U.S.C. 154(b) by 0 days.

(21) Appl. No.: 10/666,472

(22) Filed: Sep. 19, 2003

(51) Int. Cl.[7] .................................................. F16F 9/04
(52) U.S. Cl. .............................. 267/64.24; 267/64.15; 267/122; 188/266.5
(58) Field of Search ..................... 188/64.17, 64.19, 188/64.21, 64.23, 64.27, 64.28, 266.1, 266.2, 266.5, 266.6; 267/122, 123, 218, 64.24, 64.25, 64.17, 64.19, 64.21, 64.23, 64.27, 64.28; 280/5.514, 6.157, 6.159, 124.158

(56) References Cited

U.S. PATENT DOCUMENTS

| | | | | |
|---|---|---|---|---|
| 3,391,922 A | * | 7/1968 | Ludwig | 267/64.17 |
| RE27,883 E | * | 1/1974 | Vogel et al. | 267/64.21 |
| 6,412,759 B1 | * | 7/2002 | Krauss | 267/64.23 |
| 6,454,248 B2 | * | 9/2002 | Pradel | 267/64.24 |

* cited by examiner

Primary Examiner—Thomas Williams
(74) Attorney, Agent, or Firm—Harness, Dickey & Pierce, PLC

(57) ABSTRACT

A suspension system for a vehicle includes a frequency dependent damper (FDD) shock absorber defining a first pressurized working chamber. An air spring assembly defines a second pressurized working chamber. A booster enables pressure communication between the first pressurized working chamber and the second pressurized working chamber.

22 Claims, 3 Drawing Sheets

BOOSTER TO ADAPT AIR SPRING PRESSURE FOR FDD SHOCK ABSORBER

FIELD OF THE INVENTION

The present invention relates to frequency dependent dampers or shock absorbers, and more particularly to a booster to adapt air spring pressure for a frequency dependent damper or shock absorber.

BACKGROUND OF THE INVENTION

Shock absorbers are used in conjunction with automotive suspension systems to absorb unwanted vibrations which occur during driving. To absorb these unwanted vibrations, shock absorbers are generally connected between the sprung portion (body) and the unsprung portion (suspension) of the automobile. A piston is located within a pressure tube of the shock absorber and the pressure tube is normally attached to the unsprung portion of the vehicle. The piston is normally attached to the sprung portion of the vehicle through a piston rod which extends through the pressure tube. The piston divides the pressure tube into an upper working chamber and a lower working chamber. The shock absorber, by restricting fluid flow between the upper and lower working chambers, produces a damping force that counteracts the vibration that would otherwise be transmitted from the unsprung portion of the vehicle to the sprung portion of the vehicle.

Spring devices are implemented with the shock absorbers to resiliently support the vehicle on the suspension system. Exemplary spring devices include coil springs, torsion bars and air springs. As the vehicle load increases the spring devices compress. The dampening capability of the shock absorbers, however, remains constant regardless of the vehicle load. While a constant dampening ability may be acceptable in some applications, other applications would benefit from a shock absorber whose dampening characteristics vary with vehicle load.

SUMMARY OF THE INVENTION

Accordingly, the present invention provides a suspension system for a vehicle, which includes a shock absorber with variable dampening capability. The suspension system includes a frequency dependent damper (FDD) or shock absorber defining a first pressurized working chamber. An air spring assembly defines a second pressurized working chamber. A booster enables pressure communication between the first pressurized working chamber and the second pressurized working chamber.

In one feature, the booster includes a housing defining segmented chambers and a piston assembly slidably disposed within the segmented chambers. The piston assembly includes a first piston dividing a first segmented chamber and a second segmented chamber. A second piston is interconnected with the first piston and divides the second segmented chamber and a third segmented chamber. The first segmented chamber is in fluid communication with the second pressurized working chamber. The third working chamber is in fluid communication with the first pressurized working chamber. The first piston is of a larger diameter than the second piston.

In another feature, a restrictor is disposed between the air spring assembly and the booster to inhibit pressurized fluid flow therebetween.

In still another feature, the suspension system further includes a limiter that limits operation of the booster.

Further areas of applicability of the present invention will become apparent from the detailed description provided hereinafter. It should be understood that the detailed description and specific examples, while indicating the preferred embodiment of the invention, are intended for purposes of illustration only and are not intended to limit the scope of the invention.

BRIEF DESCRIPTION OF THE DRAWINGS

The present invention will become more fully understood from the detailed description and the accompanying drawings, wherein.

DETAILED DESCRIPTION OF THE PREFERRED EMBODIMENTS

The following description of the preferred embodiments is merely exemplary in nature and is in no way intended to limit the invention, its application, or uses.

Figure 1:
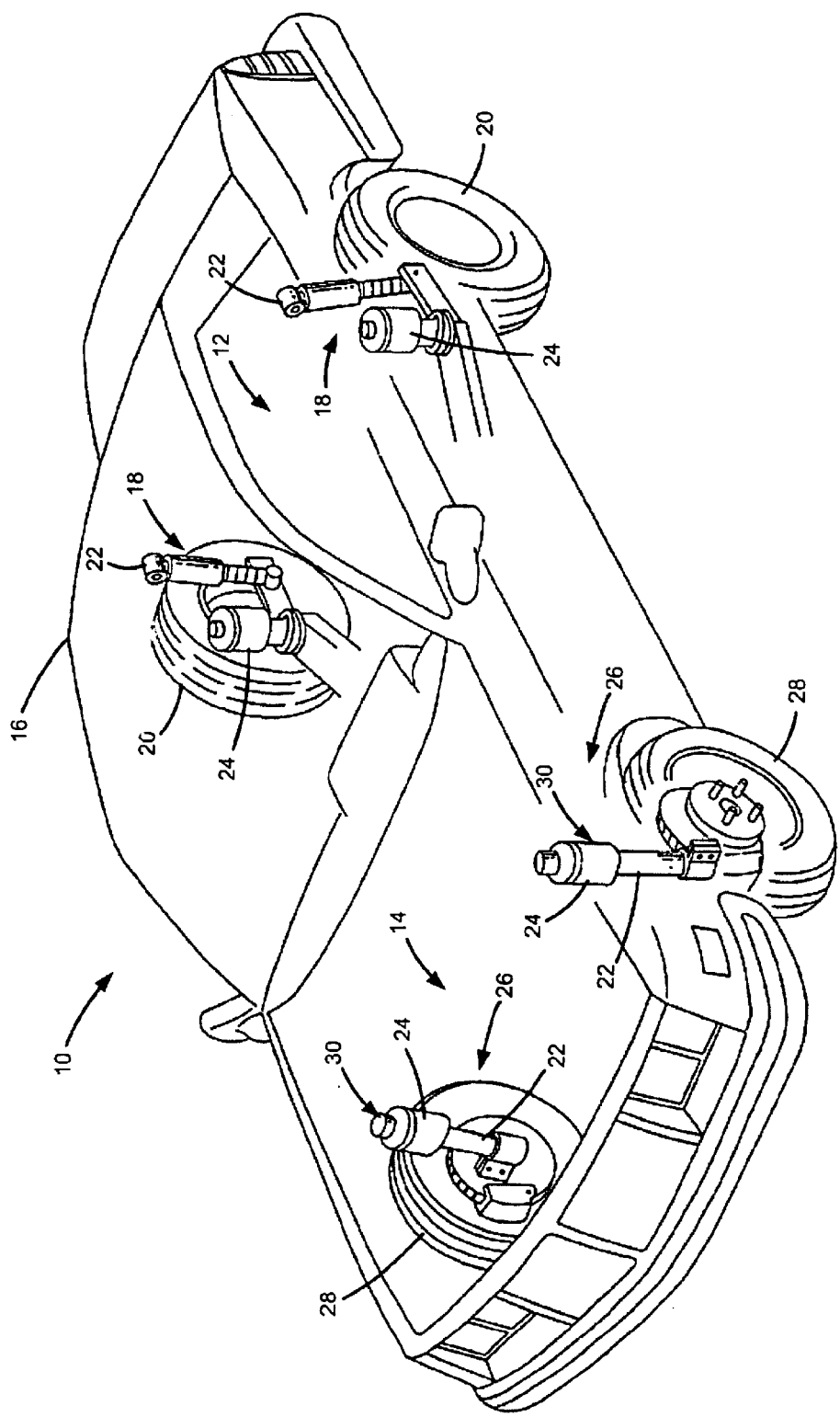
FIG. 1 is a perspective view of a vehicle having a suspension incorporating frequency dependent dampers or shock absorbers according to the present invention.

Referring now to FIG. 1, a vehicle 10 includes a rear suspension system 12, a front suspension system 14 and a body 16. The rear suspension system 12 includes a pair of independent suspensions 18 supporting a pair of rear wheels 20. Each rear independent suspension 18 is attached to the body 16 by means of a frequency dependent damper or shock absorber 22 and an air spring assembly 24. Similarly, the front suspension system 14 includes a pair of independent suspensions 26 supporting a pair of front wheels 28. Each independent front suspension 26 is attached to the body 16 and includes an integrated shock assembly 30 having the shock absorber 22 and the air spring assembly 24.

The shock absorbers 22 dampen the relative movement of the unsprung portion (i.e., the front and rear suspension systems 12 and 14) of the vehicle 10 with respect to the sprung portion (i.e., the body 16) of the vehicle 10. While the vehicle 10 has been depicted as a passenger vehicle having independent front and rear suspensions, the shock absorbers 22 and air spring assemblies 24 may be incorporated into other types of vehicles having other types of suspensions. It is also anticipated that the shock absorbers 22 and air spring assemblies 24 may be incorporated into other types of applications, including, but not limited to, vehicles having air springs, leaf springs, non-independent front and/or non-independent rear suspension systems. Further, the term "shock absorber" as used herein is meant to refer to dampers in general and thus includes MacPherson struts, spring seat units, as well as other shock absorber designs known in the art.

Figure 2:
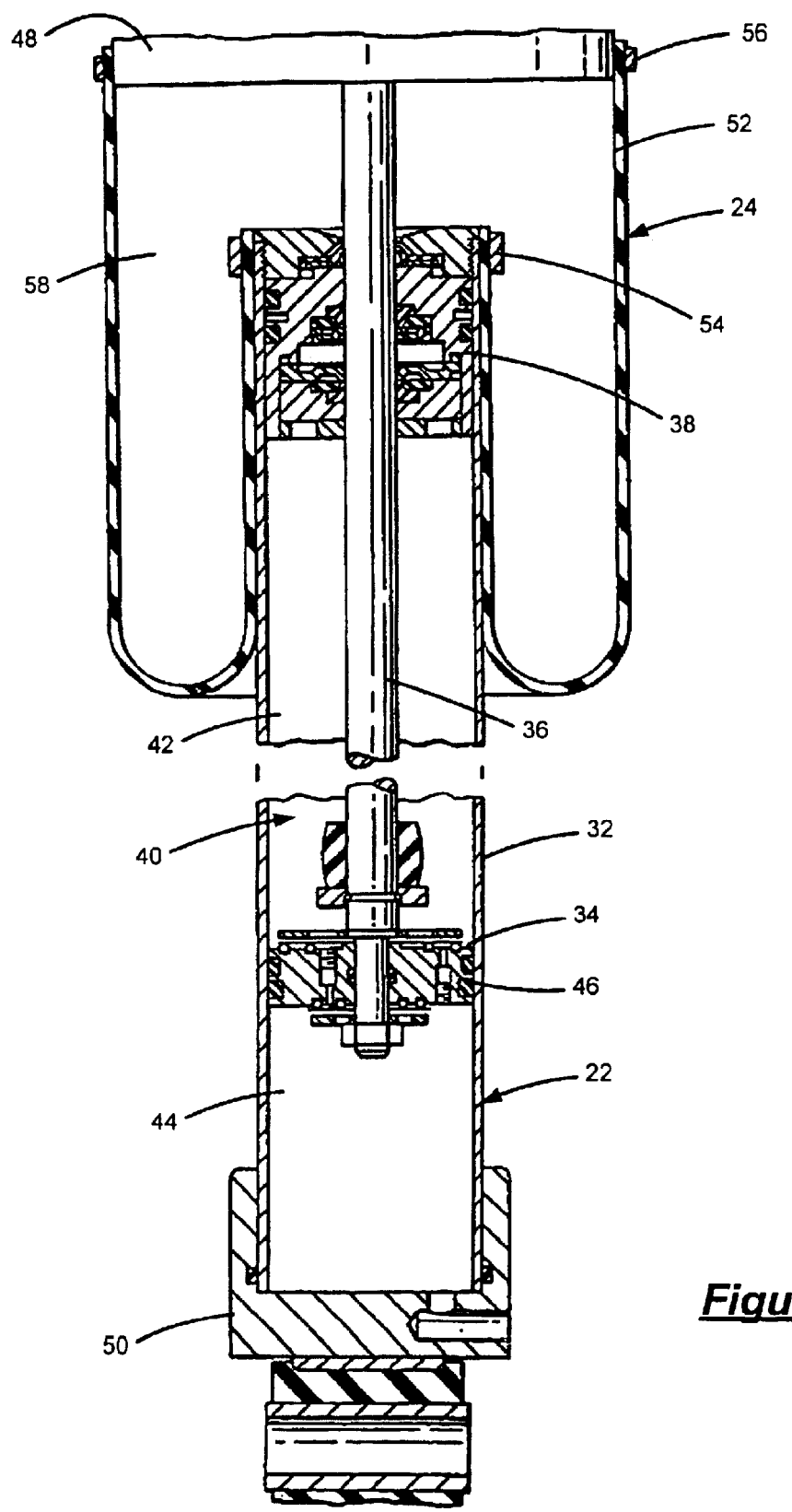
FIG. 2 is a cross-sectional side view of a frequency dependent damper or shock absorber.

Referring now to FIG. 2, the integrated shock assembly 30 is illustrated. The integrated shock assembly 30 includes the shock absorber 22 and the air spring assembly 24. The shock absorber 22 is disclosed in detail in commonly assigned U.S. patent application Ser. No. 09/778,455, filed Feb. 7, 2001 and which is expressly incorporated herein by reference. The shock absorber 22 includes a pressure tube 32, a piston assembly 34, a piston rod 36 and a rod guide assembly 38. The pressure tube 32 defines a working chamber 40 that is filled with a gas, preferably air, at a specified pressure to act as the damping medium. The piston assembly 34 is slidably disposed within the working chamber 40 and divides the working chamber 40 into an upper working chamber 42 and a lower working chamber 44. A seal assembly 46 is disposed between the piston assembly 34 and the pressure tube 32 to enable sliding movement of piston assembly 34 within the pressure tube 32 without generating undue frictional forces. The seal assembly 46 seals the upper working chamber 42 from the lower working chamber 44.

The piston rod 36 is attached to the piston assembly 34 and extends through the upper working chamber 42 and through the rod guide assembly 38, which closes the upper end of the pressure tube 32. The end of the piston rod 36 opposite to the piston assembly 34 is secured to a sprung portion of the vehicle 10 via an upper mount assembly 48. The end of pressure tube 32 opposite to the rod guide assembly 38 is closed by an end cap 50 that is connected to an unsprung portion of the vehicle 10. It is also anticipated that the piston rod 36 can be attached to the unsprung portion of the vehicle 10 and the end cap 50 attached to the sprung portion of the vehicle 10.

Figure 3:
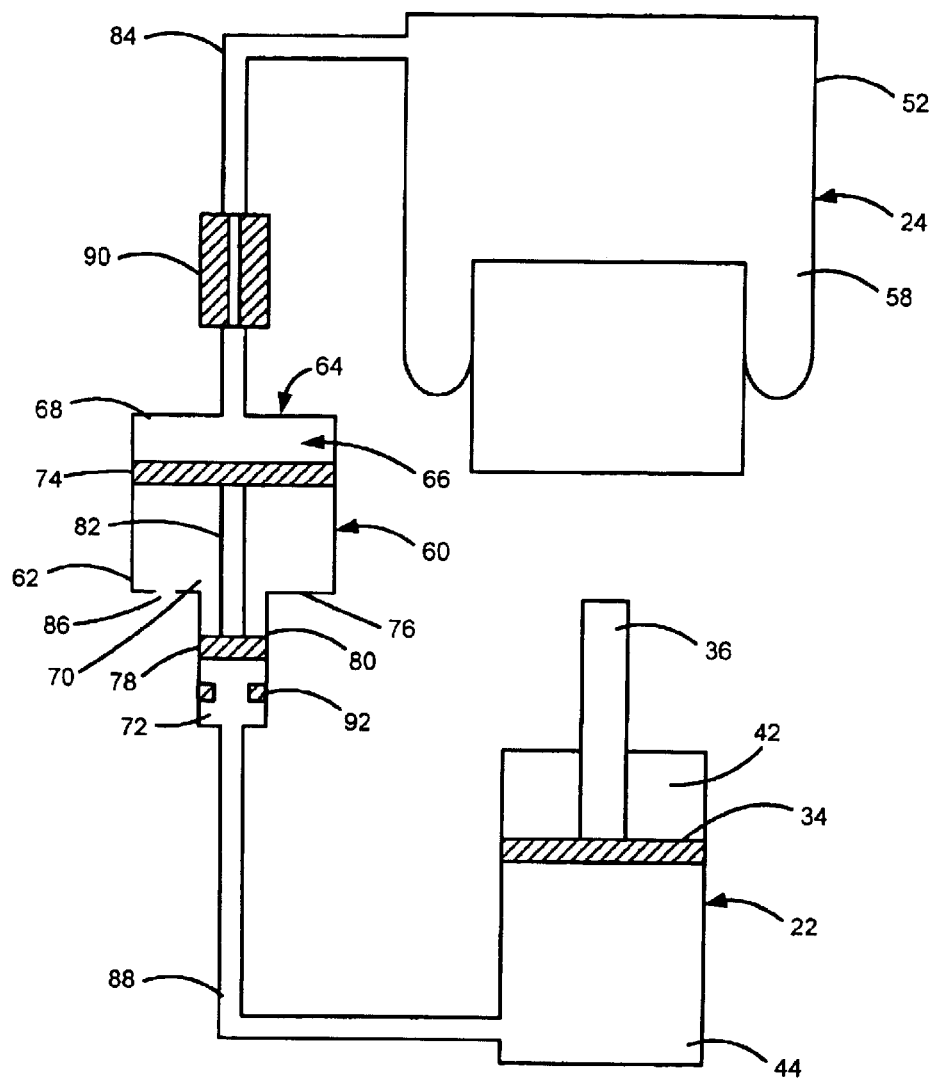
FIG. 3 is a schematic view of the suspension including the shock absorber of FIG. 2, a booster and an air spring assembly according to the present invention.

Referring now to FIGS. 2 and 3, the air spring assembly 24 of the integrated shock assembly 30 comprises a flexible bladder 52 which is secured to the shock absorber 22 using a retainer 54 and which is secured to the upper mount assembly 48 by a retainer 56. The bladder 52 defines chamber 58 that contains pressurized gas for supporting the body 16 of the vehicle 10. The chamber 58 of the bladder 52 and the lower working chamber 44 of the shock absorber 22 are pressure-dependent on one another through a booster 60.

The booster 60 boosts the air pressure within the lower working chamber 44 of the shock absorber 22. The booster 60 includes a housing 62 and a piston assembly 64 slidably disposed therein. The housing 62 defines a working chamber 66 that is separated into a first working chamber 68, a second or intermediate working chamber 70 and a third working chamber 72 by the piston assembly 64. The piston assembly 64 includes a large diameter piston 74 slidably disposed in a first section 76 of the housing 62 and a small diameter piston 78 slidably disposed within a second section 80 of the housing 62. The large diameter piston 74 is connected to the small diameter piston 78 by a piston rod 82.

The first working chamber 68 is in fluid communication with the chamber 58 of the air spring assembly 24 through a conduit 84. The intermediate working chamber 70 is in fluid communication with atmosphere through a vent 86. The third working chamber 72 is in fluid communication with the lower working chamber 44 of the shock absorber 22 through a conduit 88. A restrictor 90 is optionally provided to restrict fluid flow through the conduit 84. The restrictor 90 inhibits dynamic interaction between the air spring assembly 24 and the shock absorber 22. An end stop 92 is optionally provided to limit sliding movement of the piston assembly 64. The end stop limits the static pressure within the shock absorber 22 to provide a non-linear relationship between the pressure in the air spring assembly 24 and the shock absorber 22.

For both the integrated shock assembly 30 and the separate shock absorber 22 and air spring assembly 24, the air pressure within the air spring assembly 24 is lower than the pressure within the shock absorber 22. The booster 60 enables boosting of the air pressure within the air spring assembly 22 and adjustment of the power dissipation ability of the shock absorber 22 based on the load of the vehicle 10. As the vehicle load is increased a load force $F_{LOAD}$ acts on the air spring assembly 24 until a static state is achieved. $F_{LOAD}$ increases the pressure ($P_{ASA}$) within the air spring assembly 24. $P_{ASA}$ acts across the surface area ($A_{LDP}$) of the large diameter piston 74 applying a force ($F_{LDP}$) and inducing movement of the large diameter piston 74. The large diameter piston 74 moves until the static state is achieved.

As the large diameter piston 74 is caused to move, the small diameter piston 78 correspondingly moves. The pressure ($P_{LWC}$) within the lower working chamber 44 acts across the surface area ($A_{SDP}$) of the small diameter piston 78. Thus, prior to achieving the static state, as the small diameter piston 78 is caused to move and $P_{LWC}$ increases. Upon achieving the static state the forces are balanced across the piston assembly 64 to provide:

$$F_{LDP} = F_{SDP} \tag{1}$$

where: $F_{SDP}$=the force acting on the small diameter piston 78.

These forces can be expressed in terms of $P_{ASA}$ and $P_{LWC}$ to provide:

$$P_{ASA} A_{LDP} = P_{LWC} A_{SDP} \tag{2}$$

$A_{LDP}$ can be expressed as a multiple of $A_{SDP}$. This relationship is expressed as:

$$A_{LDP} = n A_{SDP} \tag{3}$$

where: n>1.

Combining equations 2 and 3 provides:

$$P_{LWC} = n P_{ASA} \tag{4}$$

Thus, the booster 60 multiplies $P_{ASA}$ by the factor n and applies that pressure to the lower working chamber 44 as $P_{LWC}$.

$P_{ASA}$ can be expressed as a function of $F_{LOAD}$ according to the following:

$$P_{ASA} = \frac{F_{LOAD}}{A_{ASA}} \tag{5}$$

where: $A_{ASA}$=the total surface area of the bladder 52 over which $P_{ASA}$ acts. Equation 5 can be integrated into equation 4 to provide:

$$P_{LWC} = n \frac{F_{LOAD}}{A_{ASA}} \tag{6}$$

Equation 6 illustrates that $P_{LWC}$ is a proportional to $F_{LOAD}$ and therefore, the dampening power of the shock absorber 22 is dependent on $F_{LOAD}$.

Implementation of the booster 60 between the air spring assembly 24 and the shock absorber 22 enables a load dependent shock absorber 22. More specifically, the power dissipated by the shock absorber 22 is a function of the static pressure therewithin. The air pressure within the air spring assembly 24 is proportional to the load of the vehicle 20. The booster 60 enables use of the air pressure within the air spring assembly 24 to adapt the pressure within the shock absorber 22.

The description of the invention is merely exemplary in nature and, thus, variations that do not depart from the gist of the invention are intended to be within the scope of the invention. Such variations are not to be regarded as a departure from the spirit and scope of the invention.

What is claimed is:

1. A suspension system for a vehicle, comprising:
    a frequency dependent damper defining a first pressurized working chamber;
    an air spring assembly defining a second pressurized working chamber; and
    a booster enabling pressure communication between said first pressurized working chamber and said second pressurized working chamber, said booster defining a first booster chamber and a second booster chamber, a cross-sectional area of said first booster chamber being different than a cross-sectional area of said second booster chamber such that a first change in pressure in said first pressurized chamber causes a second change in pressure in said second pressurized chamber, said first change in pressure being different than said second change in pressure.

2. The suspension system of claim 1 wherein said booster comprises:
    a housing defining said first and second booster chambers; and
    a piston assembly slidably disposed within said first and second booster chambers.

3. The suspension system of claim 2 wherein said piston assembly comprises:
    a first piston disposed in said first booster chamber; and
    a second piston interconnected with said first piston and disposed in said second booster chamber.

4. The suspension system of claim 3 wherein said first booster chamber is in fluid communication with said first pressurized working chamber and said second booster chamber is in fluid communication with said second pressurized working chamber.

5. The suspension system of claim 4 wherein said first piston is of a larger diameter than said second piston.

6. The suspension system of claim 1 further comprising a restrictor disposed between said air spring assembly and said booster to inhibit pressurized fluid flow therebetween.

7. The suspension system of claim 1 further comprising a limiter that limits operation of the booster.

8. A suspension system disposed between a sprung portion and an unsprung portion of a vehicle, comprising:
    a frequency dependent damper defining a first pressurized working chamber;
    an air spring assembly integrated with said frequency dependent damper and defining a second pressurized working chamber; and
    a booster enabling pressure communication between said first pressurized working chamber and said second pressurized working chamber, said booster defining a first booster chamber and a second booster chamber, a cross-sectional area of said first booster chamber being different than a cross-sectional area of said second booster chamber such that a first change in pressure in said first pressurized chamber causes a second change in pressure in said second pressurized chamber, said first change in pressure being different than said second change in pressure.

9. The suspension system of claim 8 wherein said booster comprises:
    a housing defining said first and second booster chambers; and
    a piston assembly slidably disposed within said first and second booster chambers.

10. The suspension system of claim 9 wherein said piston assembly comprises:
    a first piston disposed in said first booster chamber; and
    a second piston interconnected with said first piston and disposed in said second booster chamber.

11. The suspension system of claim 10 wherein said first booster chamber is in fluid communication with said first pressurized working chamber and said second booster chamber is in fluid communication with said second pressurized working chamber.

12. The suspension system of claim 11 wherein said first piston is of a larger diameter than said second piston.

13. The suspension system of claim 8 further comprising a restrictor disposed between said air spring assembly and said booster to inhibit pressurized fluid flow therebetween.

14. The suspension system of claim 8 further comprising a limiter that limits operation of the booster.

15. A vehicle, comprising:
    a sprung component;
    an unsprung component; and
    a suspension system disposed between said sprung portion and said unsprung portion, said suspension system comprising:
    a frequency dependent damper defining a first pressurized working chamber;
    an air spring assembly defining a second pressurized working chamber; and
    a booster enabling pressure communication between said first pressurized working chamber and said second pressurized working chamber, said booster defining a first booster chamber and a second booster chamber, a cross-sectional area of said first booster chamber being different than a cross-sectional area of said second booster chamber such that a first change in pressure in said first pressurized chamber causes a second change in pressure in said second pressurized chamber, said first change in pressure being different than said second change in pressure.

16. The vehicle of claim 15 wherein said booster comprises:
    a housing defining said first and second booster chambers; and
    a piston assembly slidably disposed within said first and second booster chambers.

17. The vehicle of claim 16 wherein said piston assembly comprises:
    a first piston disposed in said first booster chamber; and
    a second piston interconnected with said first piston and disposed in said second booster chamber.

18. The vehicle of claim 17 wherein said first booster chamber is in fluid communication with said first pressurized working chamber and said second booster chamber is in fluid communication with said second pressurized working chamber.

19. The vehicle of claim 18 wherein said first piston is of a larger diameter than said second piston.

20. The vehicle of claim 15 further comprising a restrictor disposed between said air spring assembly and said booster to inhibit pressurized fluid flow therebetween.

21. The vehicle of claim 15 wherein said frequency dependent damper and said air spring assembly comprise an integrated shock assembly.

22. The vehicle of claim 15 further comprising a limiter that limits operation of the booster.

* * * * *